United States Patent [19]

Petroski

[11] 4,082,672
[45] Apr. 4, 1978

[54] MOBILE SLUDGE TRAILER AND METHOD OF FILLING AND EMPTYING SAME

[75] Inventor: Alex Petroski, Springfield, Pa.

[73] Assignee: Liquid Removal Service Co., Inc., Broomall, Pa.

[21] Appl. No.: 714,973

[22] Filed: Aug. 16, 1976

[51] Int. Cl.$^2$ ............................ C02C 1/02; C02C 3/00
[52] U.S. Cl. .................................... 210/205; 210/218; 210/220; 210/241
[58] Field of Search ................... 210/198 R, 205, 218, 210/220, 241, 320, 10, 120; 214/83.28; 280/5 C; 296/28 D, 39 R; 302/25, 52, 53, 57

[56] References Cited

U.S. PATENT DOCUMENTS

| | | | |
|---|---|---|---|
| 1,619,297 | 3/1927 | Hackley | 214/83.28 X |
| 2,711,465 | 6/1955 | Sanborn | 210/120 |
| 2,780,369 | 2/1957 | Kaney | 280/5 C X |
| 3,212,824 | 10/1965 | Emery et al. | 280/5 C X |
| 3,414,332 | 12/1968 | Merrill | 214/83.28 X |
| 3,546,111 | 12/1970 | Busch | 210/10 |
| 3,625,137 | 12/1971 | Johnson | 280/5 C X |
| 3,655,050 | 4/1972 | Fifer | 210/218 X |
| 3,666,103 | 5/1972 | Green | 210/241 X |
| 3,920,552 | 11/1975 | Elkern | 210/241 X |

FOREIGN PATENT DOCUMENTS 698,254  11/1964  Canada ................ 280/5 C

Primary Examiner—Charles N. Hart
Assistant Examiner—Robert H. Spitzer
Attorney, Agent, or Firm—Benasutti Associates, Ltd.

[57] ABSTRACT

A novel trailer is described which is particularly well-suited for receiving, transporting and unloading sludges which range in consistency from nearly liquid to semi-solid or otherwise extremely viscous materials. The novel trailer of the present invention is adapted to selectively promote aerobic or anaerobic digestion of the sludges contained therein by utilizing a novel pressure equalization system and other means. Further, the pressure of gases, particularly methane gas, which is produced as a result of said digestion is harnessed in part to facilitate the easy unloading of sludge from the trailer. Additionally, auxiliary pressurization means is provided to pressurize the head space within said tank during unloading, while a novel ejection means is disposed adjacent to or within the discharge opening which will supply, if desired, an aerated product under pressure for transfer to adjacent facilities without additional pumping. A novel, double-frusto conical tank of substantially ovate cross-section is provided having ring-like baffles disposed therein which create chutes therebelow. These chutes are provided with novel reinforcing rectangular members which also collect any sludge which inadvertently leaks through the floor of the tank.

5 Claims, 6 Drawing Figures

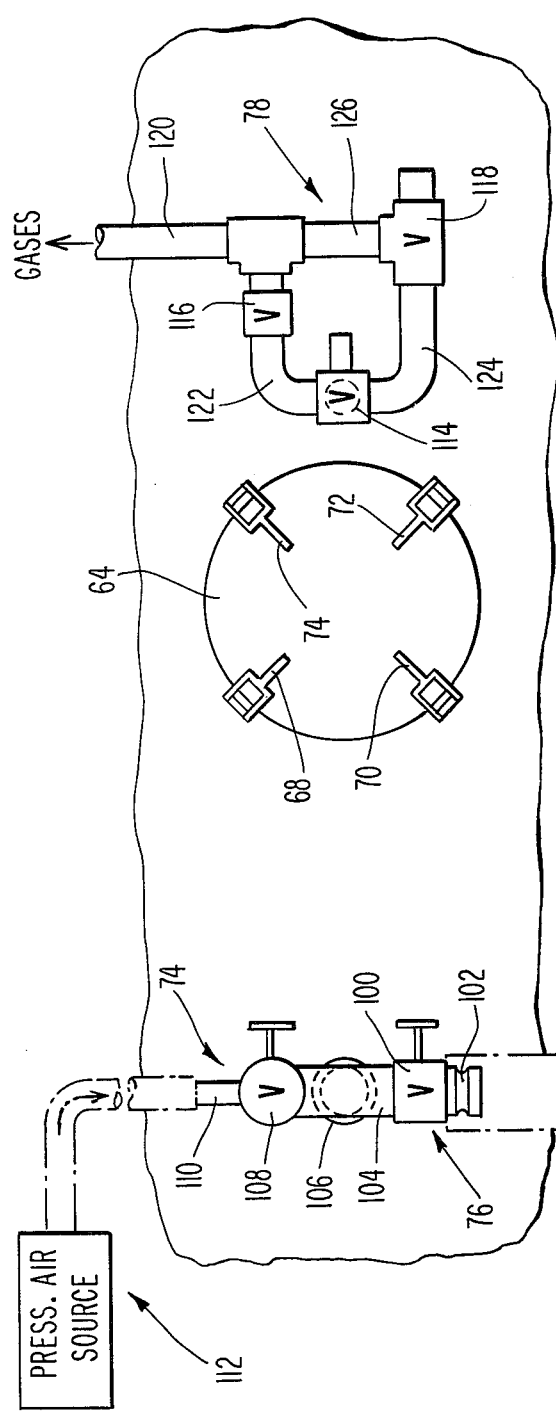
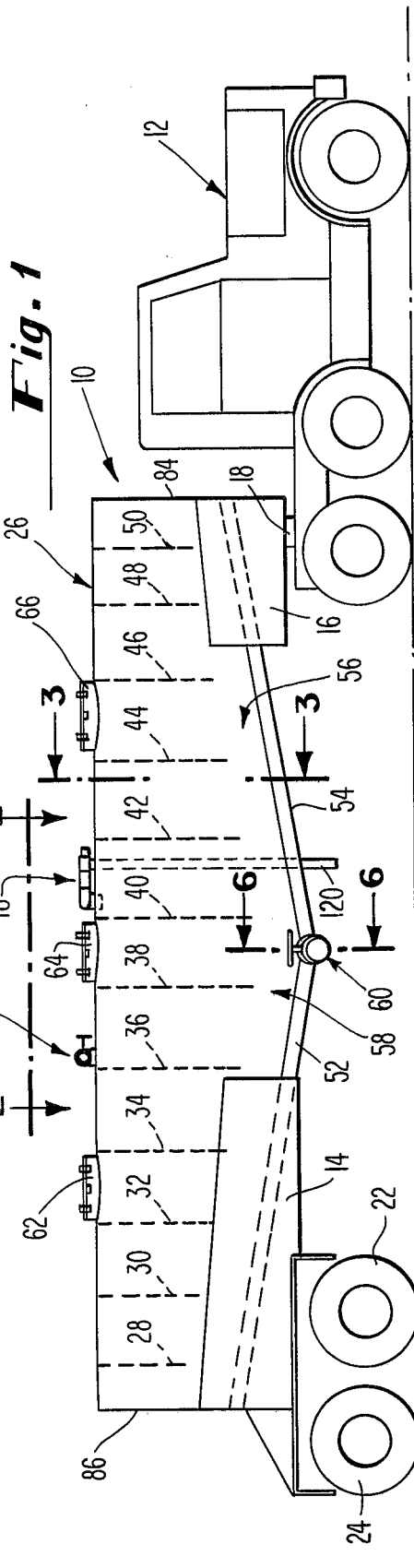
Fig. 1
Fig. 2

MOBILE SLUDGE TRAILER AND METHOD OF FILLING AND EMPTYING SAME

BACKGROUND OF THE INVENTION

From time to time in the cleaning of catch basins, lagoons, or other facilities, it has become necessary to pump large quantities of extremely viscous material into mobile collection units for transport to appropriate disposal sites.

Heretofore, the sludge transport industry has generally utilized substantially cylindrical trailers which were originally designed to transport industrial grade liquid chemicals, as for example, fuel heating oil, gasoline, etc. Such trucks may either be substantially flat-bottomed trucks or trucks which have one or more low spots disposed thereon which were originally adapted to facilitate the emptying of the liquid materials carried thereby. In order to provide the rigidity necessary in order to reinforce the tanks of such trucks, standard designs have called for interior baffles disposed in planes substantially perpendicular to the longitudinal axis of the tank, which interior baffles are provided at their base with small openings allowing the liquids or other materials contained in those trucks to drain therethrough for emptying.

Unfortunately, unlike almost all industrial grade chemicals, sludges and other industrial wastes are not homogenous, at least as compared with industrial grade liquid chemicals, and often contain large masses of solid materials which tend to clog drainage ports and passages. While it has heretofore been desired to increase the ability of sludge to drain through the drainage ports provided in the interior baffles referred to above by increasing the diameter of those ports, the amount by which the diameter of such drainage ports may be increased is limited by the fact that such ports must be disposed on the lower peripheral edges of such ring-shaped baffles and therefore these ports substantially reduce the strength of the baffles and therefore the value of the reinforcement provided thereby. As a result, free sludge flow during the emptying process is difficult to achieve and as much as from 10 to 20% of the sludge originally carried by the sludge truck remains as residue in the emptied truck and must be maually flushed out to prevent thickening of the sludge to a substantially solid mass upon aging. The manual flushing process is hindered somewhat, however, by the fact that the action of bacteria in degrading the sludge may produce poisonous gases, thereby preventing workers from entering the tank to be cleaned.

SUMMARY OF THE INVENTION

The present invention overcomes many of the disadvantages of prior art sludge trucks in that a novel double-frusto conical tank of substantially ovate cross-section is provided wherein two opposing sloping chute sections terminate in a discharge means which, in combination with a novel ejection means, facilitates the rapid removal of sludge therefrom. A plurality of parallel substantially ring-shaped baffles are utilized to brace the tank, however, due to the fact that an ovate cross-section is employed in the tank, a chute portion of substantial size is formed therebelow which allows the easy passage of relatively large sludge particles to slide to the discharge means. Adequate reinforcement is provided for the small bottom portion of the ovate cross-section due to the selection of an appropriate ovate configuration coupled with the provision of a novel rectangular reinforcement disposed directly below the chute portion which extends for the entire length of the sludge trailer.

In addition to the novel tank configuration described above, the sludge trailer of the present invention provides for efficient loading of sludge into the tank as well as various means for facilitating anaerobic or aerobic digestion of the sludges transported or stored within the truck. Further means are provided to facilitate the rapid and complete discharge of sludges contained within the truck through the use of pressurization and ejection means which additionally may be used to provide aeration or other treatment of the sludge prior to its transfer to its intended disposal site.

Accordingly, the primary object of the present invention is a provision of a novel sludge trailer for receiving, transporting and discharging viscous, semi-solid or dishomogenous sludges or similar industrial waste products. Another object of the present invention is a provision of a novel tank which facilitates the rapid and complete emptying of sludges contained therein. A further object of the present invention is a provision of pressurization means and ejection means which facilitate the rapid discharge of sludge from the trailer. A further object of the present invention is a provision of a sewage sludge trailer having novel pressure equalization means for facilitating the anaerobic or aerobic digestion of sludges contained within the tank. These and other objects of the present invention will become apparent from the following more detailed description of the present invention.

BRIEF DESCRIPTION OF THE DRAWINGS

FIG. 1 is a side view of the preferred embodiment of the present invention showing the trailer mounted on a conventional tractor or cab;

FIG. 2 is a greatly enlarged fragmentary top view of a portion of the top of the trailer shown in FIG. 1, taken as indicated by the lines and arrows 2—2 in FIG. 1;

DETAILED DESCRIPTION OF THE DRAWINGS

Figure 4:
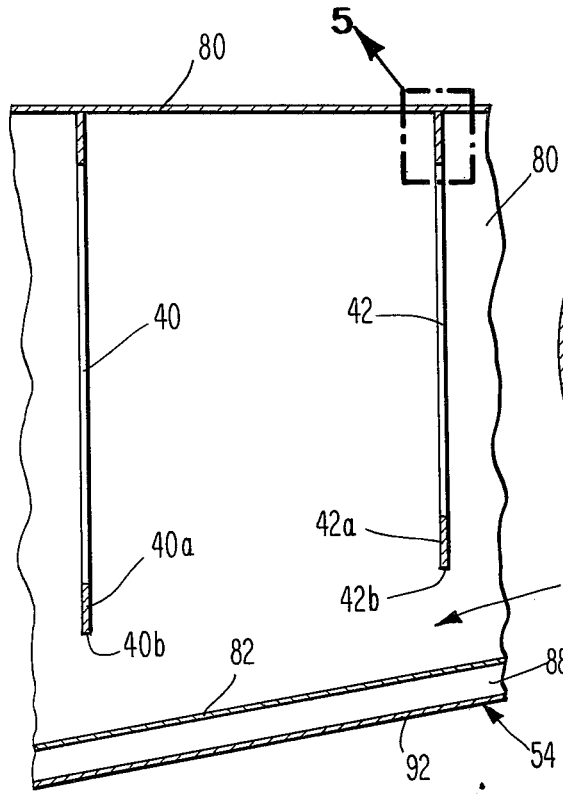
FIG. 4 is a greatly enlarged fragmentary cross-section of a portion of the tank as illustrated in FIG. 3, taken as indicated by the lines and arrows 4—4 in FIG. 3.

Although specific forms of the invention have been selected for illustration in the drawings, and the following description is drawn in specific terms for the purpose of describing these forms of the invention, this description is not intended to limit the scope of the invention which is defined in the appended claims.

The present invention generally relates to a trailer designated generally 10 which is adapted for use with a standard tractor or cab designated generally 12 to facilitate the easy mobile transport of sewage sludges and other industrial waste sludges from site to site. The trailer designated generally 10 comprises front and rear frame portions 16 and 14, the front portion of which is provided with a standard trailer hitch to pivotally engage the tractor 12, and the rear frame portion of which is provided with wheels 22 and 24 and other standard apparatus for allowing the trailer to be pulled along the highway by the tractor 12 in a standard manner.

Figure 3:
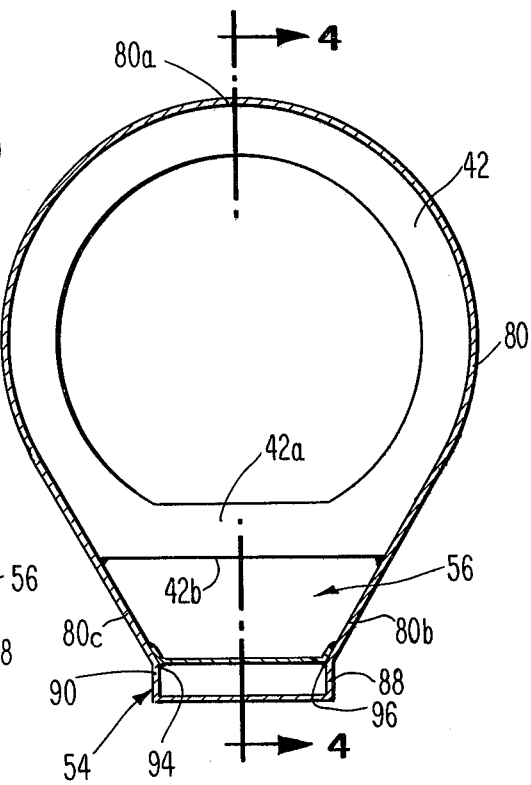
FIG. 3 is an enlarged cross-section of a portion of the tank of the trailer shown in FIG. 1 taken as indicated by the lines and arrows 3—3 in FIG. 1.

The trailer 10 of the present invention generally comprises a tank designated generally 26 and the various peripheral equipment associated therewith. The configuration of the tank is that of a double-frusto conical tank of substantially ovate cross-section, as illustrated in the figures. Disposed within the tank are a plurality of baffles 28-50 which are disposed in parallel fashion within the tank 26 to provide support and reinforcement to the tank. As illustrated in FIGS. 1 and 3, the baffles 28-50 do not extend through the full height of the tank, but rather terminate at some distance from the bottom of the tank but above rectangular reinforcements 52 and 54. This configuration forms chutes designated generally 56 and 58 which slope from either end of the truck towards the discharge means designated generally 60, which facilitates the unloading of the sludge carried in the trailer. Provided along the top peripheral surface of the trailer of the present invention are a plurality of hatches 62, 64 and 66 which are of a standard type but which may be sealed to withstand substantial internal pressures by means of latches 68-74. Also located along the top peripheral edge of the trailer are the pressurization means designated generally 74, the sludge loading means designated generally 76, and the pressure equalization means designated generally 78.

Figure 5:
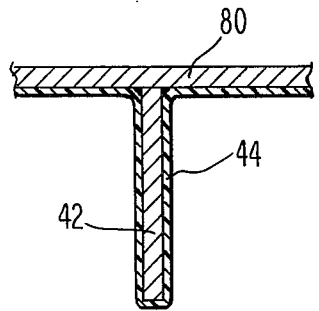
FIG. 5 is a greatly enlarged fragmentary view of a portion of the tank shown in FIG. 4, taken as indicated by arrow 5 in FIG. 4 showing the intersection between the tank wall and a baffle and also illustrating the coating disposed on the interior of the tank.

Referring now to the particular structure of the tank 26, which is illustrated in cross-section in FIGS. 3, 4 and 5, it may be seen that the tank 26 comprises a wall 80, floor 82, baffles 28-50, end walls 84 and 86, and rectangular reinforcements 52 and 54. As seen in FIG. 3, rectangular reinforcement 54 generally comprises vertical extension portions 88 and 90 of tank wall 80 which form substantially right angles with sub-floor 92. Floor 82 is welded by welds 94 and 96 at the intersection between floor 82, wall 80 and extension portions 88 and 90. While it is anticipated that the floor 82 will form a liquid-tight seal along that intersection, one of the advantages of the structure of the rectangular reinforcement illustrated is that any leakage through floor 82 will not be discharged into the environment, but rather will be retained by sub-floor 92. As seen in FIG. 3, the tank wall 80 is of substantially ovate cross-section and may be bisected into two bilaterally symmetric halves by a substantially vertical line such as the line 4—4 in FIG. 3. The upper peripheral surface portion of the tank wall, which portion is nearer the larger end or the ovate figure described thereby, is labeled 80a in FIG. 3. Similarly, the floor 82 generally describes the smaller end of the ovate figure while baffle 42 is seen to be nearly ring-shaped having only a slightly straightened portion 42a disposed near the bottom thereof. This modification in the shape of the ring-shaped baffle 42 maximizes the volume of chute 56 while, nonetheless, due to its nearly circular configuration, retaining outstanding reinforcing characteristics. As a result of the configuration described above, extremely heavy materials may be loaded and retained for transport in the tank 42 while a chute defined by floor 82, lower baffle edge 42b and lower wall portions 80b and 80c is formed, which is extremely efficient during the unloading process.

Since most sludges are extremely thick, in many instances their properties during unloading more closely approximate semisolids or solid suspensions than liquids. Accordingly, the sludge truck of the present invention is provided with an anticorrosive low friction interior coating, a portion of which is illustrated in FIG. 5. The coating 94 is disposed on all interior surfaces of the tank and discharge means and may consist of TEFLON ®, epoxy, or other coating materials which are known for decreasing the sliding-frictional resistance of materials thereacross, while being acid-resistant.

The function and structure of the sludge loading means, pressurization means, pressure equalization means, sludge discharge means and ejection means are best described in connection with the operation of the trailer of the present invention. Referring now to FIG. 2, the sludge loading means for allowing the introduction of sludge into the tank is illustrated which generally comprises sludge loading valve 100, sludge loading valve nipple 102, and a portion of tank input tee 104. The sludge trailer of the present invention is loaded according to conventional techniques through a pipe or other means as shown in phantom and labeled with the words "Sludge Loading" in FIG. 2, whereupon the sludge will be allowed to flow through sludge loading valve 100, through the appropriate portion of the tank input tee 104 and into the tank through injection port 106, which is generally disposed intermediate along the top peripheral edge 80a of the tank 26.

The pressurization means designated generally 74 in FIG. 2 is also in fluid communication with the injection port 106 by the alternate portion of tank input tee 104, and comprises pressurization valve 108, pressurization valve input 110 and a pressurized fluid source designated generally 112 in FIG. 2 and labeled with the words "Press Air Source" in FIG. 2. Therefore, during the normal filling operation, pressurization valve 108 may or may not also be in the open position depending on whether the type of bacterial action to be encouraged during the transport or storage of the sludge within the tank is aerobic or anaerobic. In the instance where aerobic respiration of bacteria is to be encouraged while the sludge is contained within the tank, during the loading process it is anticipated that the pressurized fluid source 112 will act to inject air into the stream of sludge during the sludge loading process to thereby aerate the sludge and encourage the aerobic respiration thereof. While it is anticipated that the pressurized fluid source designated generally 112 will preferably supply only air during this operation, it is anticipated that occasionally other fluids may be substituted for air, such as oxygen or other fluids which may encourage the desired respiration during the dwell time of the sludge within the tank.

In the instance where an aerobic respiration is to be encouraged, the pressurized fluid source designated generally 112 may be activated, as desired, prior to the introduction of sludge through the sludge loading means as follows. First, sludge loading valve 100 will be closed and the pressurized air source designated generally 112 will be utilized to supply carbon dioxide or other suitable gases to the tank. As will be described more fully hereinafter, the air which is contained within the tank may be bled out of the tank through any of a number of different techniques, however it is anticipated that the pressure equalization means in any event will allow air to bleed out of the tank during this initial priming process. Alternatively, carbon dioxide may be introduced only into the head space over the sludge after filling is complete, in the event that it is determined that a minimum of carbon dioxide or other protective atmospheres is to be used to prime the anaerobic digestive process. In any event, it is not anticipated that gases need to be introduced into the tank during the sludge loading process, unless it is desired to inject other fluids into the sludge during the loading thereof which will tend to encourage or promote anaerobic digestion of the sludge within the tank.

Figure 6:
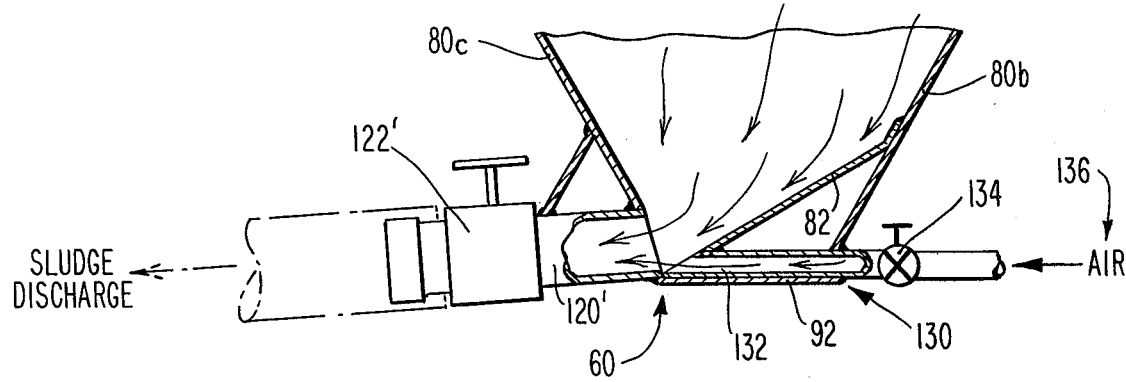
FIG. 6 is a greatly enlarged fragmentary cross-section of a portion of the tank of the trailer illustrated in FIG. 1, taken as indicated by the lines and arrows 6—6 in FIG. 1.

During and after the filling operation, the pressure equalization means designated generally 78 will function to maintain the gas pressure within the tank within a certain pre-selected range. Depending upon the type of material introduced into the tank and the type of bacterial action on the sludge within the tank, positive or negative gas pressures may be produced which, if not controlled, could have adverse effects on the structural integrity of the tank. On the other hand, certain pressures, particularly positive pressures within the tank, are beneficial and are maintained for the purpose of promoting respiration, preventing freezing, and facilitating the rapid and efficient unloading through the discharge means, as will be described more fully hereinafter. The pressure equalization means designated generally 78 comprises a vacuum valve 114, a ball check valve 116, a pressure relief valve 118, a gas discharge pipe 120, and connecting pipes 122, 124 and 126. Upon creation of negative internal pressures within the tank which are determined to create a threat that the tank will collapse, the vacuum valve 114 will act through check valve 116 to allow gases to be drawn in through pipe 120 in a direction opposite to that illustrated in FIG. 2. While this condition is not a normal condition within the tank, it is nonetheless believed that this safety feature is essential due to the possibility that sudden changes in temperature or other phenomenon within the tank could otherwise create negative pressures within the tank which are hazardous, particularly in view of the fact that leakage from the tank must be strenuously avoided in order to protect against environmentally unacceptable discharge of the sludges contained within the tank. Normally, the pressure equalization means will function under the influence of positive pressures within the tank as follows. Since it is believed in accordance with the present invention that substantial positive pressures within the tank are beneficial for the various reasons described above, the pressure equalization means is intended only to vent gas pressure to the atmosphere when that pressure exceeds a certain pre-selected value. Generally, the pressure equalization means is designed to keep the pressure within the tank to a level of plus or minus 15 psig. In the event that a positive pressure is created within the tank, ball check valve 116 closes and the pressure is retained by pressure relief valve 118. In the event that the positive pressure reaches the pre-determined maximum value, pressure relief valve 118 opens allowing gas to be discharged through pipe 126 and subsequently through gas discharge pipe 120, thereby eliminating any possibility that the trailer could explode as a result of internal pressures created therein. Referring now to FIG. 6 wherein the discharge and ejector means are illustrated, it may be seen that the floor 82 is somewhat modified to slope towards discharge pipe 120' so that sludge as indicated by the arrows in FIG. 6 will naturally tend to slide through discharge pipe 120' and discharge valve 112'. As a result, at the intersection of chute areas 56 and 58 over the discharge means, the configuration of the chute has been somewhat modified to approach a triangular shape rather than a parallelogram as described above. During the unloading process, sludge loading valve 100 is closed and the pressurized fluid source designated generally 112 is activated to inject air or other pressurized fluids into the head space of the tank. Similarly, the sludge discharge valve 122' is opened and the sludge is allowed to discharge as a result of the hydraulic and pneumatic pressures which are created by the sludge and pressurized fluid in the head space above. In order to further facilitate the rapid discharge of sludge from the sludge truck, an ejector means designated generally 130 in FIG. 6 is provided, wherein an ejector pipe 132, ejector valve 134 and pressurized fluid source 136 are provided to further aid in the discharge of sludge from the trailer. In the preferred embodiment, the ejector pressurized fluid source 136 may be attached to or formed as a part of the pressurized fluid source designated generally 112 in FIG. 2. By injecting air under pressure as illustrated in FIG. 6 at the point of intersection between the chute and discharge pipe 120' in the direction of that discharge, it is anticipated that many solids will be broken up and that substantial discharge pressures will be attained which will facilitate the extremely rapid unloading of sludge without the concomitant need to pump that sludge to its intended disposal site. This feature takes on great importance when it is understood that in many climates, environmental temperatures are such that the use of auxiliary pumping equipment is not feasible due to freezing problems.

In addition to providing a novel ejection of the sludge through the discharge pipe and discharge valve, as illustrated in FIG. 6, the ejection means of the present invention may further act to introduce oxygen, air, or other fluids into the sludge not only during discharge, but also, in the event that discharge valve 122' is closed, into the sludge itself. Therefore, in the event that aerobic respiration is to be encouraged, the ejection means may be continuously operated during the transport of the sludge to bubble air through the sludge contained therein. During this process, the pressure equalization means will allow any excess pressure which builds up during that process to be discharged into the atmosphere, and it is further anticipated that relatively uniform aeration will result in spite of the single point injection mode due to the fact that during transport, considerable mixing of the sludge normally occurs. By the same token, it is often desirable to either provide sludge which is being discharged from a sludge trailer, either with a pre-aeration prior to subsequent processing, or, alternatively, with an introduction into the sludge stream upon discharge of certain conditioning agents such as a lime slurry which will act to prepare that sludge for subsequent processing. While it has heretofore been the standard practice of sludge haulers to carry such lime slurries to the site at which the sludge is collected, and to introduce such lime slurries into the sludge prior to transport, it is anticipated that in the present instance, the lime slurry or other conditioning substances need not be trucked or otherwise transported to the collection site, but may rather be stored for use at the dump or subsequent processing site for initial injection into the sludge through the ejection means at the time that the sludge is discharged from the sludge trailer. Accordingly, substantially greater volumes of sludge may be transported away from the collection site, without the concomitant necessity to transport the substantially greater volumes of slurry containing sludges from the pick-up to the dump site.

It will be understood that various changes in the details, materials and arrangements of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent and Trademark Office, and is not intended to limit the scope of the invention described and claimed herein.

What is claimed is:

1. A trailer for receiving, transporting and unloading sludges which are at least partly biodegradable, comprising:
    (a) a frame;
    (b) a tank mounted on said frame, said tank being a double-frusto conical tank of substantially ovate cross-section mounted on said frame so that it may be bisected into two bilateral symmetric portions by a substantially vertical plane; said plane describing at least two intersecting lines disposed near the lower end of said ovate cross-section, said lines slopping downwards to their point of intersection, and said discharge means being disposed substantially at the point of intersection of said lines, said tank further comprising a substantially planar floor extending along said lines for the entire length of said tank and a plurality of parallel, substantially circular ring-shaped baffles disposed within said tank, said baffles extending from the top peripheral edge of said tank around said tank to points substantially parallel and spaced apart from said floor and having straightened lower edges parallel to said floor extending between said points to form at least one discharge chute defined between said baffles, opposing portions of the walls of said tank and said floor;
    (c) loading means for introducing sludge into said tank;
    (d) discharge means disposed at the bottom of said tank for allowing sludge to discharge from said tank;
    (e) pressurization means for pressurizing the head space of said tank to thereby increase the pneumatic and hydraulic pressure at said discharge means to facilitate more efficient discharge of the sludge therefrom; and
    (f) ejection means for ejecting fluid into said tank at the point of intersection of said tank and said discharge means, said ejection means injecting fluid under pressure into said tank toward said discharge means in the direction of discharge of sludge through said discharge means whereby said sludge is entrained in said fluid for discharge through said discharge means.

2. The invention of claim 1 wherein said fluid is a liquid sludge-conditioning agent.

3. The invention of claim 1 wherein said trailer further comprises pressure equalization means for maintaining the gas pressure within said trailer within a preselected range of positive and negative pressures, said pressure equalization means comprising a vacuum valve in communication with the interior of said tank, said vacuum valve further communicating alternatively with at least ball check and pressure relief valves; said ball check and pressure relief valves communicating with a single discharge pipe.

4. The invention of claim 1 wherein said pressurization means further comprises a pressurized fluid source and means for injecting a fluid into said sludge within the loading means prior to the introduction of said sludge into said tank.

5. The invention of claim 1 wherein said tank further comprises a sub-floor disposed parallel to and spaced apart from said floor, said sub-floor being connected to said floor by a plurality of transverse members to form a hollow, substantially rectangular liquid-tight channel under the length of said floor, said sub-floor reinforcing said floor and said discharge chute and further collecting and and retaining material leaking through said floor.

* * * * *